(12) United States Patent
Hirai

(10) Patent No.: US 7,557,855 B2
(45) Date of Patent: Jul. 7, 2009

(54) FOCUS POSITION DETECTION APPARATUS AND METHOD

(75) Inventor: Shinya Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 654 days.

(21) Appl. No.: 11/336,322

(22) Filed: Jan. 20, 2006

(65) Prior Publication Data

US 2006/0203118 A1    Sep. 14, 2006

(30) Foreign Application Priority Data

Jan. 21, 2005  (JP) ............... 2005-014326

(51) Int. Cl.
*H04N 5/232* (2006.01)
(52) U.S. Cl. .............. 348/345; 348/349; 348/353
(58) Field of Classification Search ......... 348/345, 348/349, 353, 354, 355, 356
See application file for complete search history.

(56) References Cited

U.S. PATENT DOCUMENTS

| 4,804,831 | A  | * | 2/1989  | Baba et al. ........... 250/201.2 |
| 6,683,652 | B1 | * | 1/2004  | Ohkawara et al. ....... 348/347 |
| 7,307,662 | B2 | * | 12/2007 | Yoshida et al. ......... 348/349 |
| 2002/0041334 | A1 | * | 4/2002 | Okawara ............ 348/335 |
| 2003/0063212 | A1 | * | 4/2003 | Watanabe et al. ....... 348/349 |
| 2005/0052564 | A1 | * | 3/2005 | Ishii ................ 348/345 |

FOREIGN PATENT DOCUMENTS

| JP | 2708904     | 10/1997 |
| JP | 2002-318341 | 10/2002 |
| JP | 2003-279838 | 10/2003 |
| JP | 2004-219581 | 8/2004  |

OTHER PUBLICATIONS

First Office Action issued on Feb. 17, 2009 in Japanese Patent Application No. 2006-011181.

* cited by examiner

*Primary Examiner*—James M Hannett
(74) *Attorney, Agent, or Firm*—Canon USA Inc IP Division

(57) ABSTRACT

A focus position detection apparatus calculates a focus position of a focus lens using an image signal obtained from an image sensing element. The apparatus comprises an acquisition unit that acquires focus states for a predetermined distance range, a control unit that controls the acquisition unit to acquire focus states at first intervals and second intervals which is shorter than the first intervals, and a focus position detection unit that determines a focus position on the basis of the focus states obtained at the first or second intervals. The control unit changes whether to acquire focus states at the second intervals based on the focus states obtained at the first intervals.

5 Claims, 4 Drawing Sheets

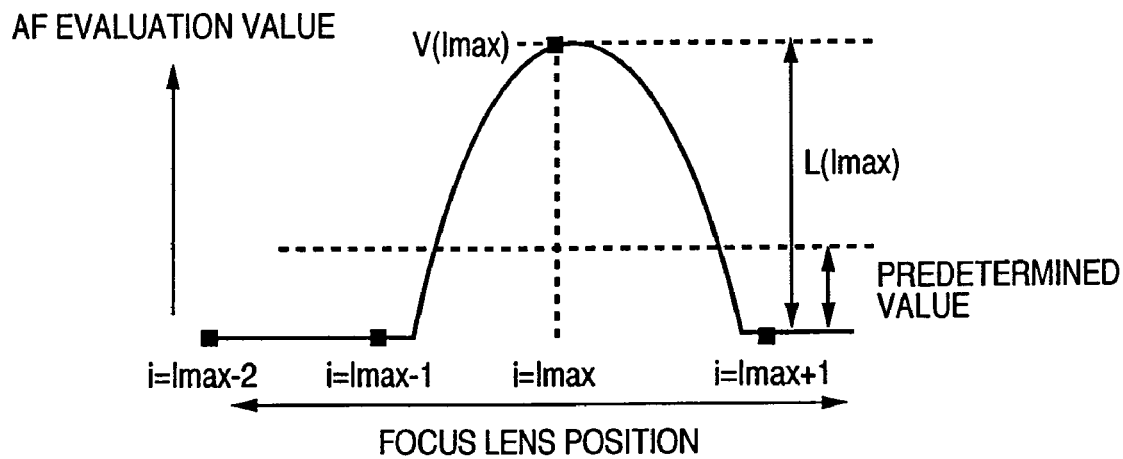
F I G. 3
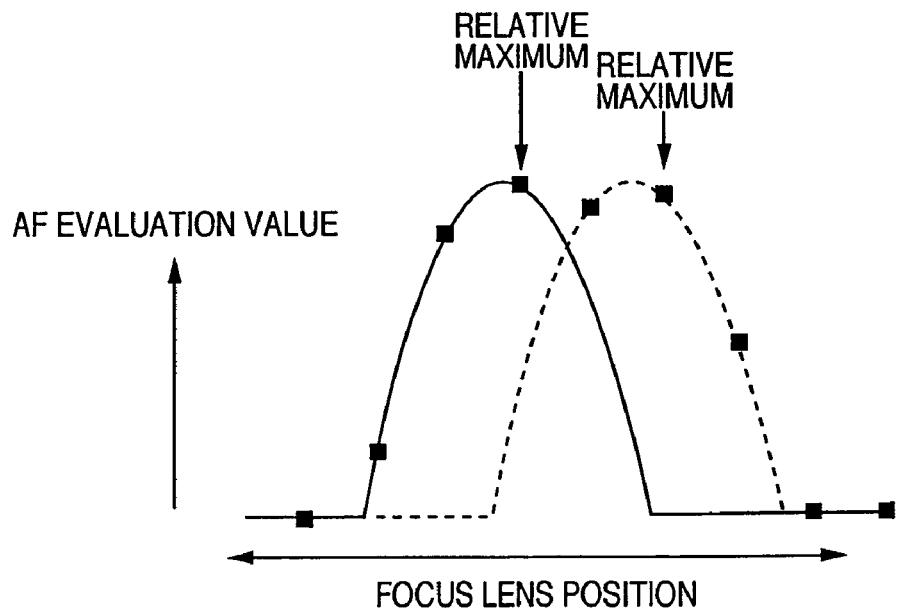
F I G. 4

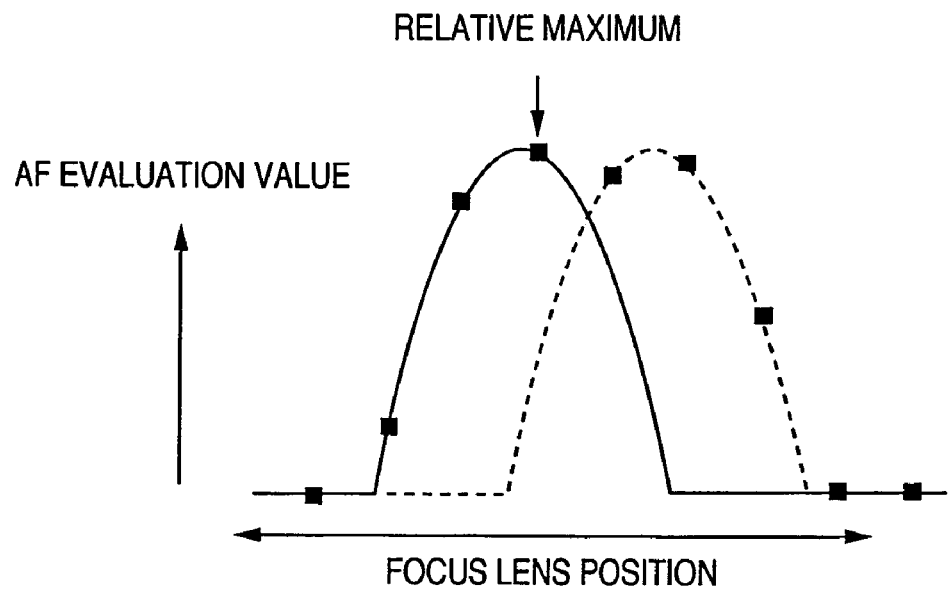
F I G. 5
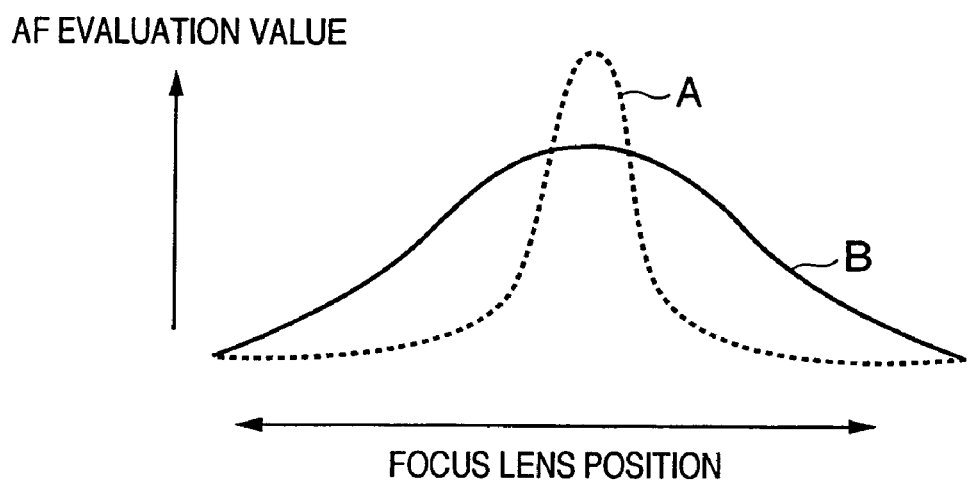
F I G. 6

FOCUS POSITION DETECTION APPARATUS AND METHOD

FIELD OF THE INVENTION

The present invention relates to a focus position detection apparatus and a focusing method that are suitable for a digital camera, a digital video camera, and the like that perform a focusing operation on the basis of a video signal obtained from an image sensing element.

BACKGROUND OF THE INVENTION

Some auto-focus apparatuses (focusing apparatuses) used in digital cameras, digital video cameras, and the like create a signal for evaluating a focused state using a video signal obtained from an image sensing element and determine a focus position using the signal. Since such a method does not require a sensor exclusively used for auto-focus, the method has an advantage that cost is low, parallax is not present, and accuracy is high. However, it is necessary to drive a focus lens within a predetermined distance range to sequentially create evaluation signals. Thus, when the focus lens needs to be driven over a relatively wide range because the focal length of the lens is long or a full aperture F value is small, for example, there is a disadvantage that it takes considerably a long time to attain an in-focused state.

As a method coping with this problem, for example, a method described in Japanese Patent No. 2708904 is known. In an invention of the patent, a subject distance range is searched through in a relatively coarse step to specify a relative maximum of an evaluation value and the distance range near this relative maximum is searched again in a fine step to determine a focus position. According to this method, when a search range is sufficiently large, since the total number of data to be acquired decreases compared with the case in which the subject distance range is searched throughout only in the fine step, it is possible to reduce a time to attain an in-focus state.

However, in the method described above, since after searching the subject distance range in the coarse step, search in the fine step is always performed, it is necessary to cause the focus lens to operate reciprocatingly many times. Thus, it sometimes takes a long time to attain in-focus state (focusing time).

SUMMARY OF THE INVENTION

The present invention has been made in consideration of the above situation, and has as its object to provide a focus position detection apparatus and a focusing method that can reduce a focusing time while securing focusing accuracy.

According to the present invention, the foregoing object is attained by providing a focus position detection apparatus that calculates a focus position of a focus lens using an image signal obtained from an image sensing element, the apparatus comprising: an acquisition unit that acquires focus states for a predetermined distance range; a control unit that controls the acquisition unit to acquire focus states at first intervals and second intervals which is shorter than the first intervals; and a focus position detection unit that determines a focus position on the basis of the focus states obtained at the first or second intervals, wherein the control unit changes whether to acquire focus states at the second intervals based on the focus states obtained at the first intervals.

According to the present invention, the foregoing object is also attained by providing a focus position detection method that calculates a focus position of a focus lens using an image signal obtained from an image sensing element, the method comprising: acquiring focus states at first intervals for a predetermined distance range; determining whether to acquire focus states at second intervals which is shorter than the first intervals on the basis of the focus states acquired at the first interval; acquiring focus states at the second intervals when it is determined to acquire the focus states at the second intervals; and when focus states are not acquired at the second intervals, detecting a focus position on the basis of the focus states acquired at the first intervals, and when focus states are acquired at the second intervals, detecting a focus position on the basis of the focus states acquired at the second intervals.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 3 is a graph showing a first example of a distribution of AF evaluation values for which search in a fine step is required;

FIG. 4 is a graph showing a second example of the distribution of AF evaluation values for which search with moving the focus lens at the low velocity is required;

FIG. 5 is a graph showing a third example of the distribution of AF evaluation values for which search with moving the focus lens at the low velocity is required; and FIG. 6 is a graph showing an example of the distribution of AF evaluation values of two images, one includes relatively a large amount of high frequency components and the other includes relatively a small amount of high frequency components.

DETAILED DESCRIPTION OF THE PREFERRED EMBODIMENT

A preferred embodiment of the present invention will be described in detail in accordance with the accompanying drawings.

Figure 1:
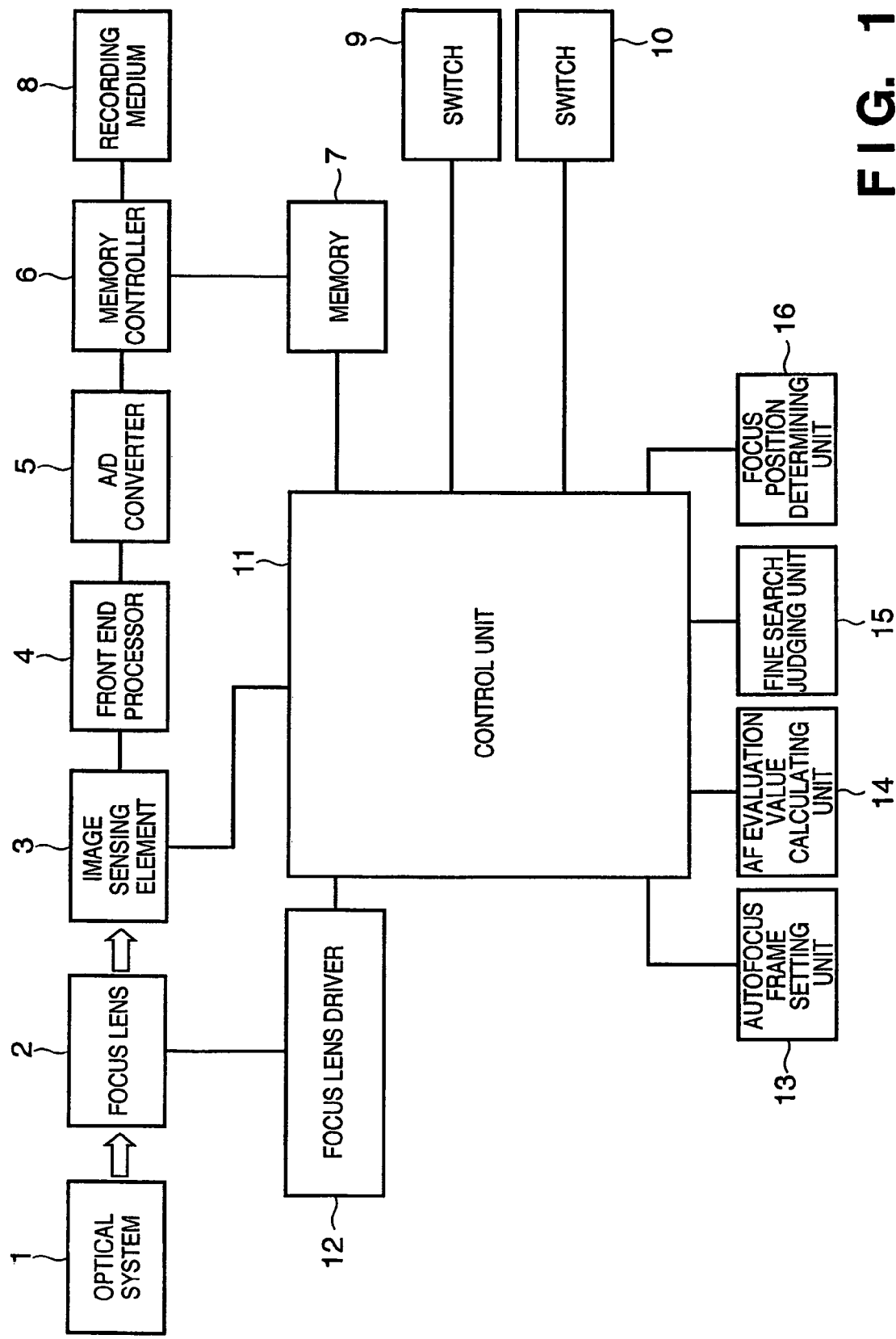
FIG. 1 is a diagram schematically showing a digital camera including a focus position detection apparatus according to an embodiment of the invention.

FIG. 1 is a diagram schematically showing a digital camera including a focus position detection apparatus according to an embodiment of the invention.

An optical system 1 and a focus lens 2 are provided in the digital camera according to this embodiment. An image sensing element 3 photoelectrically converts light focused by the optical system 1 and the focus lens 2. An analog signal outputted from the image sensing element 3 is processed by a front end processor 4 including a correlated double sampling (CDS) circuit for removing an output noise, a nonlinear amplifier for performing amplification before analog-to-digital (A/D) conversion, and the like and, then, digitized by an A/D converter 5. A digital signal is stored in a memory 7 via a memory controller 6 and converted into image data by a signal processing circuit (not shown) to be recorded on a recording medium 8.

A focusing operation of setting the focus of the focus lens 2 on a main object is controlled mainly by a control unit 11. A focus lens driver 12 is constituted to drive the focus lens 2 at two different velocities (high velocity and low velocity) in this embodiment.

The focusing operation according to this embodiment is summarized here. First, the focus lens 2 is driven at a high velocity by the focus lens driver 12, and an AF evaluation value calculation unit 14 calculates a signal (an AF evaluation value) corresponding to the contrast of an image using the image signals sensed at a predetermined period.

This calculation is performed for one or two or more autofocus evaluation frames (AF frames) set by an autofocus (AF) frame setting unit 13.

The AF evaluation value calculating unit 14 performs the calculation of a signal (an AF evaluation value) of the sensed image corresponding to contrast as described below. First, the AF evaluation value calculating unit 14 applies a band-pass filter which selectively passes signals of predetermined frequency range in a horizontal direction to respective lines of image data output from pixels of the image sensing unit 3 within the AF frames. Subsequently, the AF evaluation value calculating unit 14 selects a signal having a largest absolute value among signals output from the band-pass filter for each line. Then the AF evaluation value calculating unit 14 integrates selected signals in a vertical direction. Therefore, since signals with large contrast in the horizontal direction are detected and integrated in the vertical direction, an S/N ratio of the signals is improved. By performing such calculation, it is possible to obtain a signal having a largest value in an in-focus state and a smallest value in a defocus state. Therefore, if photographing is performed with a focus lens position where a relative maximum of such signals is obtained, it is possible to obtain an image focused on an object.

When the AF evaluation value is calculated, a fine search judging unit 15 judges using this AF evaluation value whether the focusing operation by moving the focus lens 2 at the low velocity is necessary. It should be noted that when moving the focus lens 2 at the low velocity, the AF evaluation values are calculated using image signals sensed at the same period as when moving the focus lens 2 at the high velocity. Therefore, the distance between positions of the focus lens 2 at which AF evaluation values are acquired are shorter when moving the focus lens 2 at the low velocity than at the high velocity.

When the focusing operation with moving the focus lens 2 at the low velocity is unnecessary, a focus position determining unit 16 determines a focus position and, then, drives the focus lens 2 to the determined position. On the other hand, when the focusing operation with moving the focus lens 2 at the low velocity is necessary, the focus lens 2 is driven by the focus lens driver 12 at the low velocity. After the AF evaluation value is calculated as described above, the focus position determining unit 16 determines a focus position. Then the focus lens 2 is moved to this focus position. Switches 9 and 10 are for switching an operation mode. For example, a focusing operation is performed when the switch 9 is operated and image sensing and recording of an image are performed when the switch 10 is operated.

Figure 2:
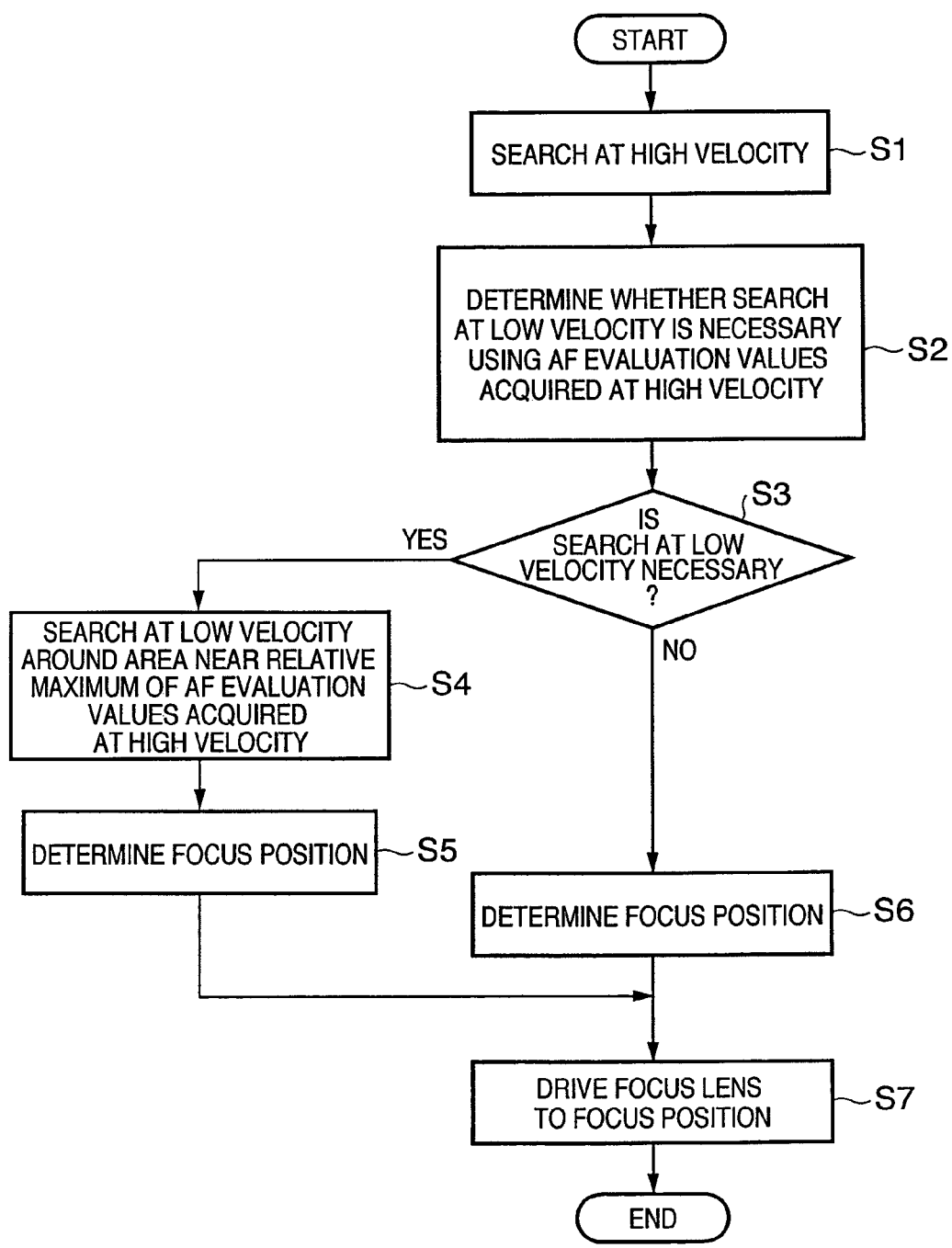
FIG. 2 is a flowchart showing an operation of the focus position detection apparatus according to the embodiment.

The focusing operation will be explained more in detail with reference to a flowchart shown in FIG. 2.

First, in step S1, the focus lens 2 is driven at the high velocity, and the AF evaluation value calculating unit 14 calculates AF evaluation values. In step S2, whether search while moving the focus lens 2 at the low velocity is necessary is determined using the AF evaluation values. Details of a case in which the search while moving the focus lens 2 at the low velocity is necessary will be explained later.

After determining in step S2 whether the search while moving the focus lens 2 at the low velocity is necessary, in step S3, based on a result of the determination in step S2, the flow is branched to step S4 when the search while moving the focus lens 2 at the low velocity is necessary and branched to step S6 when the search while moving the focus lens 2 at the low velocity is unnecessary.

When the flow proceeds to step S4, AF evaluation values are acquired while moving the focus lens 2 at the low velocity around a relative maximum which is acquired by moving the focus lens 2 at the high velocity. In step S5, a focus position is determined on the basis of AF evaluation values acquired as a result of the search while moving the focus lens 2 at the low velocity. On the other hand, when the flow proceeds to step S6, a focus position is determined on the basis of AF evaluation values acquired as a result of the search with moving the focus lens 2 at the high velocity.

After determining the focus position in step S5 or S6, in step S7, the focus lens 2 is driven to the focus position to obtain an in-focus state.

Examples of the case in which the search while moving the focus lens 2 at the low velocity is necessary include the following three cases.

A first example is a case where a subject includes a large number of high frequency components such as thin lines. In general, when a focus lens is moved away from a focus position, AF evaluation values damp faster as a subject includes more high frequency components. In FIG. 6, "A" shows an example that an image of an object includes a large amount of high frequency components, and "B" shows an example that an image of an object does not include much high frequency components. Therefore, a concave-down portion of AF evaluation values becomes narrow and AF evaluation values may be acquired at sampling intervals coarser than necessary sampling intervals. For example, in a case as shown in FIG. 3, an accurate focus position is not obtained. In other words, since AF evaluation value is acquired at only one position in the concave-down portion, a focus position fluctuates depending upon from which position of the concave-down portion the AF evaluation value is acquired. Note that, in FIG. 3, black squares indicate positions where sampling is performed and AF evaluation values are acquired.

It is possible to judge by, for example, calculating width of the concave-down portion of the AF evaluation values whether it is possible to specify a focus position only with the AF evaluation values acquired while moving the focus lens 2 at the high velocity. First, let positions at which the AF evaluation values are acquired while moving the focus lens 2 at the high velocity be i=1, 2, . . . , N and an AF evaluation value acquired at a position i be V(i). Then, a position where a relative maximum (i=$I_{max}$) is acquired is calculated and "L(i)=|V(i)−V(i+1)|" is calculated in the order of i=$I_{max}$, $I_{max}$+1, $I_{max}$+2, and the like. The number of positions i is counted until an inequality "L(i)>predetermined value" is not satisfied any more. Similarly, the number of positions i is also counted in an order of i=$I_{max}$−1, $I_{max}$−2, and the like.

When such processing is performed, in the example shown in FIG. 3, since the inequality "L(i)>predetermined value" is not satisfied any more when i=$I_{max}$+1 and when i=$I_{max}$−2, the number of positions i at which the inequality is satisfied is two in total (when i=$I_{max}$−1 and $I_{max}$). Thus, it is possible to judge that the width of the concave-down portion is two.

In short, the predetermined value of the width of the concave-down portion when the subject includes a large amount of high frequency components as described above is set in advance, and the width of the concave-down portion obtained as described above are compared with the predetermined value. When the width of the concave-down portion is equal to or smaller than the predetermined value, it is judged that the concave-down portion is narrow and the subject includes a large amount of high frequency components. For example, referring to FIG. 3, if the predetermined value of the width of the concave-down portion is set to two in advance, it is determined that the AF evaluation values need to be acquired while moving the focus lens 2 at the low velocity.

When a difference between a maximum Vmax and a minimum Vmin of the AF evaluation values (height of the concave-down portion) is equal to or smaller than the predetermined value, considering that the subject includes a large amount of high frequency components, it may be determined that the AF evaluation values need to be acquired while moving the focus lens 2 at the low velocity. This is because when the AF evaluation values are acquired when the concave-down portion is very narrow, there is a possibility that the concave-down portion itself cannot be detected.

A second example is a case where plural subjects are present in an AF area and the distance to the respective subjects are not the same. The AF area is an area where signals to be used for AF evaluation values are obtained among the sensed image data. Generally, a single or plurality of AF areas are provided in an image. By showing an area or areas corresponding to the AF area or areas on a finder (or a monitor) as an AF frame or frames, a photographer can see the position or positions of the AF area or areas in an image.

In such a case that a plurality of subjects are present in an AF area and the distance to the respective subjects are not the same, plural peaks of AF evaluation values exist. As shown in FIG. 4, when the feet of the concave-down portions of the AF evaluation values overlap each other, it is not possible to determine the focus position from the AF evaluation values acquired while moving the focus lens 2 at the high velocity.

in other words, it is difficult to clearly distinguish whether plural concave-down portions exist or AF evaluation values simply fluctuate due to noise. Therefore, it is necessary to obtain AF evaluation values while moving the focus lens 2 at the low velocity.

As a method of judging whether it is necessary to obtain AF evaluation values while moving the focus lens 2 at the low velocity or not when plural subjects are present in a focus evaluation area, there is a following method, for instance. According to the method, when a plurality of relative maximums of the AF evaluation values exists and the interval between the relative maximums is equal to or smaller than a predetermined value, it is determined that AF evaluation values need to be acquired while moving the focus lens 2 at the low velocity. Assume that the predetermined value of the interval between the relative maximums is set to two, and the AF evaluation values as shown in FIG. 4 are acquired. In this case, since the interval between the relative maximums is two in FIG. 4, it is determined that the AF evaluation values need to be acquired while moving the focus lens 2 at the low velocity. Further, in the case where plural relative maximums exist and the number is equal to or larger than a predetermined value, it may be determined that the AF evaluation values need to be acquired while moving the focus lens 2 at the low velocity.

In consideration of a case where a relative maximum appears with very small fluctuation of the focus lens 2 or a subject, when a signal indicating that a change in the AF evaluation values are very small or camera shake occurs is generated, for instance, a detected relative maximum does not have to be regarded as a relative maximum. Further, only a relative maximum or maximums which are equal to or larger than a predetermined ratio of a maximum AF evaluation value may be regarded as a relative maximum.

When the distance between the plural subjects (two subjects in FIG. 4) becomes closer, AF evaluation values as shown in FIG. 5 may be acquired. This is a third example. In such a case, regardless of the fact that the plural subjects exist at different distances, since there is only one relative maximum of the AF evaluation values, it is impossible to determine whether the AF evaluation values need to be acquired while moving the focus lens 2 at the low velocity with the method described above.

In such a case, it is possible to determine whether the AF evaluation values need to be acquired while moving the focus lens 2 at the low velocity, for example, as described below. The following method utilizes the fact that, among a plurality of AF evaluation values acquired while moving the focus lens 2 at the high velocity, a decreasing rate between the maximum of an AF evaluation values and an AF evaluation value acquired at an adjacent measuring position is small compared with the case where only a single concave-down portion exists.

In this method, $V(I_{max})/V(I_{max}-1)$ and $V(I_{max})/V(I_{max}+1)$ are calculated using the maximum $V(I_{max})$ of AF evaluation values and $V(I_{max}-1)$ and $V(I_{max}+1)$ adjacent to the maximum $V(I_{max})$. When at least one of $V(I_{max})/V(I_{max}-1)$ and $V(I_{max})/V(I_{max}+1)$ is equal to or smaller than a predetermined value set in advance, that is, when a change in the AF evaluation value is gentle, it is recognized that plural concave-down portions overlap one another and it is determined that the AF evaluation values need to be acquired while moving the focus lens 2 at the low velocity.

According to the above embodiment of the present invention, it is possible to reduce a focusing time while securing sufficient accuracy. This is because a focus position is determined without obtaining AF evaluation values while moving the focus lens at the low velocity for a subject that can be focused based on the AF evaluation values acquired while moving the focus lens at the high velocity.

Further in a case where a proper focus position cannot be determined unless AF evaluation values are acquired while moving the focus lens at the low velocity, it is possible to obtain sufficient focusing accuracy. This is because the AF evaluation values are acquired while moving the focus lens 2 at the low velocity.

It should be noted that in the above embodiment, the period for obtaining AF evaluation values is fixed and the focus lens 2 is moved at a high or low velocity, thereby the intervals between the focus lens positions at which AF evaluation values are acquired are changed between long and short. However, the method of changing the intervals is not limited to this, and it is possible to lengthen the intervals by making the period of obtaining AF evaluation values long while fixing the velocity of the focus lens 2. Further, it is possible to shorten the intervals by making the period of obtaining AF evaluation values short while fixing the velocity of the focus lens 2.

Furthermore, the focus lens 2 may be either kept moving or temporarily stopped at the time of obtaining AF evaluation values.

Other Embodiments

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This patent application claims the benefit of Japanese Patent Application No. 2005-014326 filed on Jan. 21, 2005, which is hereby incorporated by reference herein in its entirety.

What is claimed is:

1. A focus position detection apparatus that calculates a focus position of a focus lens using an image signal obtained from an image sensing element, the apparatus comprising:

an acquisition unit that acquires focus states for a predetermined distance range;

a control unit that controls said acquisition unit to acquire focus states at first intervals and second intervals which is shorter than the first intervals; and a focus position detection unit that determines a focus position on the basis of the focus states obtained at the first or second intervals, wherein said control unit changes whether to acquire focus states at the second intervals based on the focus states obtained at the first intervals, wherein said acquisition unit acquires focus state evaluation values from the image signals as the focus states, and said control unit changes whether to acquire focus states at the second intervals based on a distribution of focus state evaluation values obtained at the first intervals, wherein said control unit controls said acquisition unit to acquire focus states at the second intervals when a width of a concave-down portion of the distribution of the focus state evaluation values acquired at the first intervals is equal to or narrower than a predetermined threshold.

2. The focus position detection apparatus according to claim 1, wherein said control unit controls said acquisition unit to acquire focus states at the second intervals when a height of the concave-down portion of the distribution of the focus state evaluation values acquired at the first intervals is equal to or less than a predetermined value.

3. The focus position detection apparatus according to claim 1, wherein said control unit controls said acquisition unit to acquire focus states at the second intervals when a number of concave-down portions of the distribution of the focus state evaluation values acquired at the first intervals is equal to or greater than a predetermined value.

4. The focus position detection apparatus according to claim 1, wherein said control unit controls said acquisition unit to acquire focus states at the second intervals when a plurality of concave-down portions exist and the distance between local maximums of the concave-down portions is equals to or less than a predetermined threshold in the distribution of the focus state evaluation values acquired at the first intervals.

5. The focus position detection apparatus according to claim 1, wherein said control unit controls said acquisition unit to acquire focus states at the second intervals when at least one of the differences between a maximum of the focus state evaluation values and focus state evaluation values acquired at positions next to a position where the maximum is acquired is equal to or less than a predetermined threshold in the distribution of the focus state evaluation values acquired at the first intervals.

* * * * *